Dec. 11, 1951 T. T. HARRINGTON 2,577,756

COLOR TELEVISION

Filed June 3, 1946 4 Sheets-Sheet 1

INVENTOR

Thomas T. Harrington

Thomas T. Harrington
INVENTOR.

Dec. 11, 1951 T. T. HARRINGTON 2,577,756

COLOR TELEVISION

Filed June 3, 1946 4 Sheets-Sheet 3

Thomas T. Harrington
INVENTOR.

Dec. 11, 1951 T. T. HARRINGTON 2,577,756

COLOR TELEVISION

Filed June 3, 1946 4 Sheets-Sheet 4

Thomas T. Harrington
INVENTOR.

Patented Dec. 11, 1951 2,577,756

UNITED STATES PATENT OFFICE 2,577,756

COLOR TELEVISION

Thomas T. Harrington, Berkeley, Calif.

Application June 3, 1946, Serial No. 673,949

3 Claims. (Cl. 178—5.4)

This invention relates to method and system for developing electric impulses, such as television signals, for transmitting and receiving visual information in color, and more particularly relates to the production of television pictures in substantially natural color.

In the majority of television systems today the television picture is reproduced on a fluorescent screen positioned at one end of a self-luminescent cathode ray tube. In this method the fluorescent material is bombarded with an intensity modulated electron beam in accordance with received television signals. Accordingly, when the intensity modulated electron beam is impinging on the fluorescent material the electric energy of the beam is converted, at least in part, into light energy, thereby creating a self-luminescent picture on the fluorescent screen. Such a method of producing black and white television pictures, the size of which is limited by the dimensions of the end face of the cathode ray tube is satisfactory when pictures in monochrome only are required, and large size is of no importance.

Various methods have been proposed for converting tubes of the type just described into color television receivers and are well known to those skilled in the art. The sequential method of color separation and synthesis in which revolving color filters are employed has the disadvantage of reduced light efficiency.

Still other methods for converting the self-luminescent cathode ray tube to color have been proposed in which two or more monochrome images corresponding to the color images in the camera tube are reproduced simultaneously on the fluorescent screen of said tube by conventional means. In this method the said group of images are simultaneously projected by an optical projection means with color filters which restores the color to the images and forms a composite image in color on the viewing screen. The same amount of light that forms the images on the fluorescent screen is spread over the enlarged area of the viewing screen with the result that a picture of rather low light intensity is produced.

As an example of the light loss, a conventional optical system with an aperture of $f/2$ can collect only about 6% of the light flux emitted by the self-luminescent fluorescent cathode-ray tube. When the projection lens in question is combined with a color filtering system the light loss is even greater.

It is obvious that this reduced light efficiency on the viewing screen means that brighter images must be produced on the fluorescent screen before the projected color pictures have satisfactory size and screen brightness.

The present invention is therefore concerned with a television system for the production of color television images or pictures having improved light efficiency on the viewing screen. I accomplish this result through the combination of particular types of television apparatus and optical devices, whereby a new and novel color television system is produced.

In my color system the incorporation of a direct viewing cathode ray tube is unsatisfactory, due to the fact that only a small percentage of the power in an electron beam is converted into light on the viewing face of the screen.

The projection technique in my system is similar to that of the motion picture or lantern slide in that the light energy originates from an external source and is modulated in accordance with the local elemental opacity values of the image screen within the receiver. The fugative pseudo photographic images produced in the crystal of the image screen of my system may be caused to persist for substantially an entire frame scanning period, and being succeeded after this period by an image of the following frame, thus contributing further to the brightness of the projected color image on the viewing screen. The effect closely resembles the so-called intermediate film process, but with the advantage that no time is lost for processing, and no film being consumed.

From the above it is apparent that a reduced picture repetition frequency is possible. This can be lower than is usual with ordinary reception methods, due to the persistence of the image for substantially the whole frame scanning period with the result that flickering is eliminated. This would allow for a reduction in the necessary frequency band width of the transmitted signals, and could provide satisfactory pictures with a straight scanning system.

A preferable combination in my television system for accomplishing these results is the inclusion of television transmitting and receiving apparatus shown and described in the patents to Rosenthal, Nos. 2,355,110 granted on August 8, 1944; Re. 22,628 granted on April 10, 1945; and Re. 22,734 granted on March 19, 1946. In each of these patents a particular type of cathode ray tube is shown which includes a scanning cathode ray beam and a novel form of image screen.

The image screens referred to in each of the above patents consists of an alkali halide material.

The image screen in the transmitter or camera tube of Rosenthal's Patent No. 2,355,110, is adapted to convert the luminous energy of the scene to be transmitted into an electrical form of energy, to accumulate this energy and to discharge it when scanned.

When exciting radiations such as cathode rays or light of a suitable wavelength are brought in contact with certain crystals (particularly alkali halide crystals) and phosphors, by scanning or by shining upon, certain sensitive "centers" in these substances are changed from an initial state of lower energy to an excited state of higher energy. This higher state of energy has considerable stability, but its accumulated energy can be discharged, i. e., the "centers" in the excited state can be brought back to the initial state by certain external influences. The influences effecting the release of this accumulated energy from within these substances can be brought about by contact with light of a suitable wavelength (usually different from that of the exciting light), or by contact with other radiations such as cathode rays, or with heat, or with electric or magnetic fields. The term "quenching" is used to designate the action of releasing the accumulated energy, and a radiation effecting such action is termed a "quenching radiation."

In the alkali halide crystals, according to Rosenthal's patent, the sensitive "centers" are known as "color centers," and they can be produced in the crystal by artificial means. This can be accomplished by heating a crystal in the vapor of its own alkali metal or by scanning the crystal with an electron beam. Thus, by providing the crystal with color centers, the spectral range of the luminous exciting radiation can be shifted into the visible portion of the spectrum.

If such a material, such as an alkali halide crystal, is used as the image forming screen in a transmitter or camera tube as described in Rosenthal's Patent No. 2,355,110, and if such screen is associated with an electric field within the camera tube, the poles of which are connected by an external circuit, and the screen is illuminated by an exciting radiation, the result will be that a small current will flow in the circuit. Now if a quenching radiation, such as an electron beam is applied the current will suddenly increase in value and thereafter will return to a very low level. The intensities of the exciting and quenching radiations for a given temperature govern the flow of current in the external circuit connected to the signal plate of the tube, the magnitude of the current being dependent upon the intensity of the image formation radiation. By these means a varying voltage will be produced across the impedance which is included in the output circuit of the tube, and from said varying voltage the mean picture intensity at a receiver can be derived.

The apparatus serving as the receiving portion of my color television system comprises a special type cathode ray tube in which the self-luminescent fluorescent screen is replaced by an image screen of an alkali halide material. The tube is equipped with an external light source and condenser system for projecting onto a viewing screen through suitable optical means the fugitive pseudo photographic images created on the image screen by the scanning signal modulated cathode ray beam.

This type of receiver tube is described in the patents to Rosenthal Nos. Re. 22,628 and Re. 22,734.

It is known that the transparency to visible light of certain crystals can be changed to opaqueness by the action of light of certain wavelengths.

Many of the alkali and alkaline earth halides produce such crystals, such as the chlorides, bromides and iodides of sodium and potassium, lithium bromide, calcium fluoride, and strontium fluoride and chloride; and also certain silver salts such as silver bromide.

The change from transparency to opaqueness occurs when these crystals are struck by a beam of cathode rays, X-rays, radium rays or by light of a suitable wavelength. The opacity of the deposit of opaque material thus created in these crystals is dependent upon the intensity of the incident radiation. The deposit of opaque material will hereinafter be referred to as "opacity centers."

The above materials are all classified as the so-called "ionic crystals" i. e., crystals which are held together by electrostatic force, at least in part. Research has indicated that in the case of the alkali halide crystals the opacity centers can be likened to the deposit of metallic silver in the latent photographic image, in that they probably consist of loosely bound neutral alkali atoms in the interior of the crystals.

It is therefore evident that any intelligence traced upon the screen of an ionic crystal material by a beam of radiant energy, such as a cathode ray beam, is represented thereon by temporary local changes in the optical properties of the screen, such as its transparency, its reflective power, its refractive index, etc. These traces consisting of minute areas of variable opacity or transparency are created by a signal modulated beam of radiant energy, such as a cathode ray beam, scanning the screen. When such a screen is imaged with the aid of light from an external source onto a viewing screen a representation of a picture having increased light efficiency is the result.

Two types of optical devices are used in my television system. A multiple image optical reproducing type is combined with the transmitter and a multiple image optical projection type is combined with the receiver, and by substituting these optical devices for the conventional lens objectives ordinarily used in monochrome television systems, comprising apparatus of the type previously described, I produce an entirely new color television system.

Optical devices of this type for accomplishing these results are shown and described in the patents to Thomas No. 2,097,706, granted on November 2, 1937; No. 2,145,437, granted on January 31, 1939; No. 2,152,224, granted on March 28, 1939; No. 2,251,177, granted on July 29, 1941; and No. 2,281,607, granted on May 5, 1942.

The principal object of this invention is, therefore, to provide a method and system for transmitting and receiving television pictures in natural colors with improved light efficiency on the viewing screen.

Another object of the present invention is to provide a color television system in which the light energy at the screen of the receiver is derived from an external source of high intensity and not from the converted modulated electric energy of the cathode ray beam.

Still another object of the present invention is to provide a color television system in which the images produced on the screen of the receiver persist substantially for an entire frame scanning period.

Still another object of the present invention is to provide a method and system for converting monochrome television systems comprising particular types of television transmitters and receivers into television systems adapted to produce pictures in substantially natural colors.

In accordance with the present invention, a color television system is provided which utilizes the additive method for producing pictures in color.

The additive method of color reproduction comprises the separate registration of the three fundamental color-sensations and their subsequent recombination. All of the colors are formed by the mixture in various proportions of the three fundamental or primary colors, red, green, and blue. In this embodiment of my invention four colors are used, viz., the primary colors and violet.

In my television system the translation of the scene to be transmitted from light to electricity occurs in the camera tube, the transmitting portion of the system, to which I have operatively positioned a multiple image optical reproducing device with multiple color filters contained therein representative of the primary colors, adapted to project simultaneously a group of four separated images identical except for color, on the image screen of the camera tube, each image being a color record of one of the fundamental or primary colors of the scene to be transmitted. The camera tube is provided with means for developing a cathode ray beam for scanning as a single frame successive elemental areas of the said group of separated images on the image screen, to produce a train of electrical impulses or picture signals representative of the brightness and color of the elemental areas of said images.

The reproduction of the plurality of images is accomplished by a multiple image optical projection device operatively positioned with the receiving portion of the system, which comprises a cathode ray picture reproducing tube, having an image screen, an external light source and condenser system, and means for producing and controlling a cathode ray beam in accordance with received picture signals, and scanning means for reconverting on the image screen the received picture signals, thereby to produce a group of four separated, substantially identical monochromatic luminous images, each of which is representative of one of the colored images in the camera tube, and lacks only the proper color to be identical.

The said group of four monochromatic images produced on the image screen are efficiently illuminated by an external light source and condenser system, and are simultaneously projected by said light source and condenser system through said multiple image optical projection device which is similar to the optical device used on the camera tube, having identical color filters representative of the primary colors (red, green, blue and violet), in which each separate identical image is colored its appropriate hue as it passes through the projection device to be superimposed in perfect register as one composite image on a viewing screen, the final result being an exact reproduction of the original scene in substantially natural colors.

The combination of apparatus that I will now disclose with reference to the accompanying drawings embodies my invention.

Figure 2:
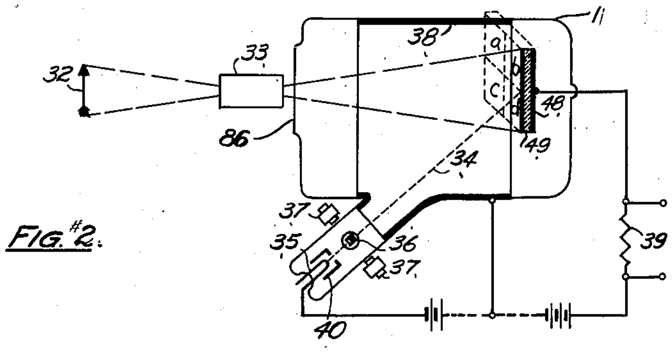
Fig. 2 shows schematically the camera tube with multiple image optical reproducing device in position.

Referring now to the drawing, and more particularly to Fig. 2 thereof, there is shown the transmitter or camera tube 1 of the beam scanning type, being of the type disclosed by Rosenthal's Letters Patent No. 2,355,110. The tube 1 comprises an image screen consisting of an alkali halide crystal 49 mounted on a signal plate 48. The tube 1 is provided with a light transmitting wall 86 which is preferably optically flat. The wall may be made of glass or similar transparent material. A multiple image optical reproducing device 33 is positioned exterior to the wall 86 so that a group of four separated substantially identical images *a*, *b*, *c*, and *d* of the single colored object 32 is reproduced on the surface of the crystal 49 of the tube 1. The images *a*, *b*, *c* and *d* are really color separation records of red, green, blue and violet, and are produced by multiple color filters contained within the optical device 33. The tube 1 contains the conventional electron source consisting of a beam 34 of cathode rays proceeding from the cathode 35 and being deflected by the pairs of coils 36, 37 to scan the surface of the crystal 49. Within the tube 1, and serving as the anode, and also as the negative electrode of an electric field in which the crystal is situated is a metal coating 38. The signal plate 48 serves as the positive electrode of this field. Included in the output circuit is an impedance 39, across which the picture signals are developed.

The luminous energy of the images serves as an exciting radiation. The cathode ray beam serves as the quenching radiation. The appropriate strength of the quenching action can be adjusted at the control electrode 40. The crystal 49 is previously prepared to produce color centers. This is accomplished, either by heating the alkali halide crystal in the vapor of its own alkali metal, or by bombarding it with cathode rays.

The four images *a*, *b*, *c* and *d* are grouped as shown on the crystal 49 and do not overlap. Each element of this group of four luminous differently colored images of the single colored object 32 reproduced on the crystal 49 will excite a corresponding elemental volume of the crystal to a more or less degree depending upon the intensity and color of the element. In this manner there is accumulated in each of said corresponding volume element of the image screen a corresponding amount of energy for the time period existing between two successive scannings of said elemental area of the crystal. At the expiration of this time period and at the instant when the scanning beam 34 of quenching radiation reaches such an area most of this accumulated energy is released in the form of temporarily free electrons within the volume element of the crystal 49. There is then produced a momentary increase in the constant current in the external circuit as the free electrons move in the direction of the signal plate 48. This increase is proportional to the intensity of the exciting and quenching radiations falling on the elemental area of the crystal 49.

As a result of the exciting and quenching radiations a direct current component will flow in the impedance 39 which will be equal to the sum of all the constant currents flowing through the individual volume elements, and the intensity of which for a given temperature depends upon the average intensity of the whole group of differently colored images reproduced on the crystal 49. The current impulses produced by the scanning beam 34 will be superimposed on the above mentioned constant current. In this manner the output or picture signal representative of brightness and color values of the group of images to be transmitted produces a varying voltage across the impedance 39 which can be used to modulate the amplitude of a carrier wave. Although the video or picture signals are transmitted by radio carrier waves, it is to be understood that the transmitter or camera tube 1 may be connected with receiver tube 1 through a suitable cable.

Figure 3:
Figs. 3 and 4 are diagrams showing two alternative methods of operating the arrangement of Fig. 2.

In Fig. 3 the energy variation in a volume element of the crystal with time is shown in the curve, in which the ordinates represent the energy, and the abscissae represent time. Within the period *a*—*b* the volume element is illuminated with the luminous exciting radiation, and from a low datum level *e* the energy rises to a high level *e′* in accordance with the intensity of the exciting radiation. The time *a*—*b* represents one scanning cycle. The quenching beam 34 causes the energy to return abruptly to the low level *e* during the time *b*—*c* which represents one picture element duration. In the impedance 39 the current will be represented by a curve which is the first differential of the curve of Fig. 3.

Figure 1:
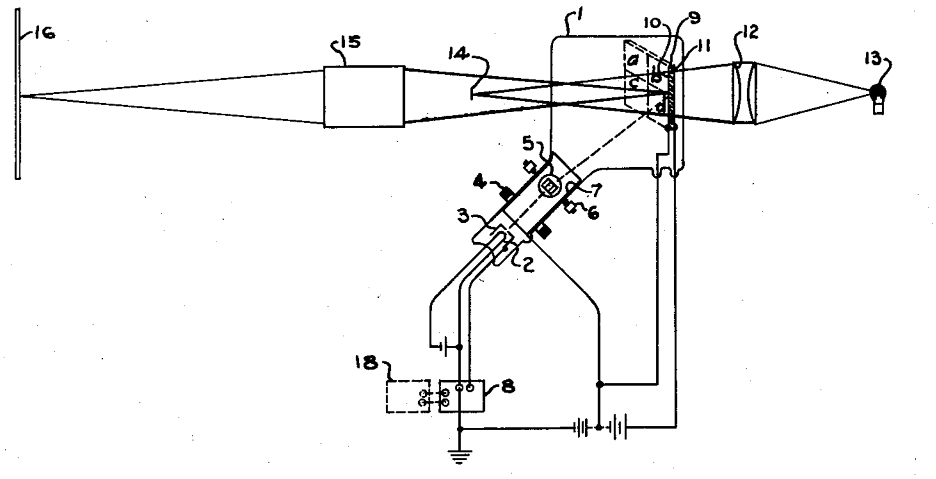
Fig. 1 shows schematically the receiver tube with multiple image optical projection device in position.

The apparatus of Fig. 1 can be modified so that the radiations are reversed, that is, the luminous energy of the images serves as the quenching radiation, and the cathode ray beam serves as the exciting radiation. In this modification a potassium chloride crystal sensitized with thallium chloride is best to use with the light which forms the images on the crystal. The intensity of the beam 34 should be adjusted to provide a suitable exciting action. The intensity of the beam 34 in this modification would be less than when used as a quenching radiation.

Figure 4:
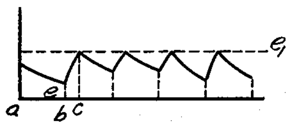

In Fig. 4 the operation of Fig. 1 in which the order of the radiations are reversed is shown.

Within the frame period *a*—*b* the luminous quenching radiation of the images reduces the energy of a volume element of the crystal from a high datum level, *e*, to a low level *e* depending upon the intensity of the radiation. Within the period *b*—*c* (the duration of a picture element) the exciting beam 34 suddenly returns the energy to the high level *e′*. In the impedance 39 the current will again be represented by a curve which is the first differential of the curve of Fig. 4.

Figure 5:
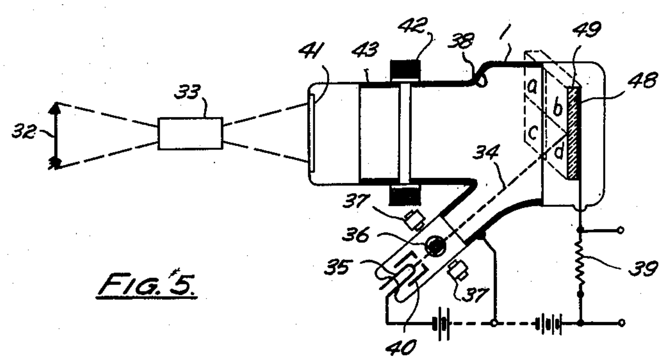
Fig. 5 shows schematically an alternate form of camera tube with multiple image optical reproducing device in position.

Fig. 5 shows an alternate form of transmitter or camera tube. The multiple image optical reproducing device 33 is positioned exterior to the wall 85 so that a group of four optical images of the single colored object 32 is reproduced on the semi-transparent photo electric layer 41 of the tube 1. The electrons emitted by the layer 41 are focused on the crystal 49 by means of the electron optical system 38, 42, 43 to form on the surface of the crystal 49 a group of four electron-optical images of the colored object 32. These images *a*, *b*, *c* and *d* are color separation records of red, green, blue and violet, and are produced by multiple color filters contained within the optical device 33. The crystal is scanned with the cathode ray beam 34 and picture signals representative of the brightness and color values of the images to be transmitted are developed across the impedance 39. The intensity of the electron-optical images is such as to excite the volume elements of the crystal, while the cathode ray beam 34 being of higher intensity permits this beam to serve as the quenching radiation. The operation of the apparatus is the same as that described with reference to Figs. 2 and 3.

Figure 6:
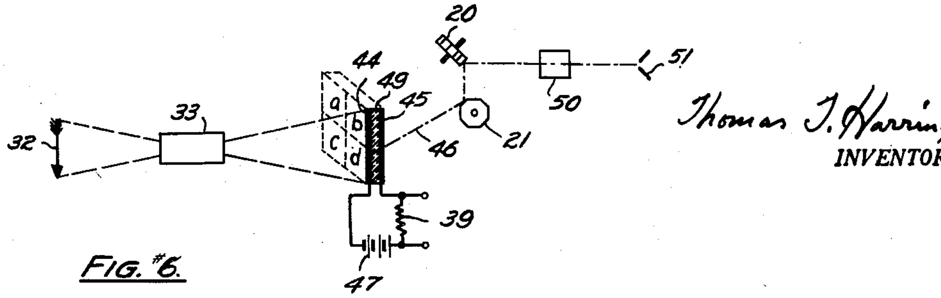
Fig. 6 shows schematically a light beam being used for scanning the image screen of the camera tube with multiple image optical reproducing device in position.

In Fig. 6 light is employed both for the image forming and scanning radiations. The crystal 49 has a semi-transparent electrode 44, 45 on each face which can be a metal film or an electrically conducting oxide such as zinc oxide. The multiple image optical reproducing device 33 is positioned exterior to the crystal 49 and reproduces a group of four images of the single colored object 32 on one side of the crystal, and the opposite side is scanned with a beam of light 46 which is produced by an optical system (shown diagrammatically at 50) from the arc 51 and which has the scanning motion imparted thereto by the scanning members 20, 21. The electrode 44, 45 are connected in series with a source of potential 47 and the impedance 39, across which the picture signals representative of the brightness and color values of the images to be transmitted are developed.

The crystal 49 is provided with color centers so that the light from the object 32 will exert the necessary exciting action. The scanning light, which is of a very high intensity relative to that of the image-forming light serves as the quenching radiation.

Alternatively, the image-forming light can be used as the quenching radiation, and the scanning light as the exciting radiation.

In my color television system the transmitting portion consists of the combination of a type of camera tube 1 and a multiple image optical reproducing device 33 as described above and shown in Figs. 2, 5 and 6.

The receiving portion of my color television system consists of the combination of a particular type of receiver tube 1 and a multiple image optical projection device 15. This combination will be described in connection with Figs. 1 and 9.

The multiple image optical reproducing device 33 and the multiple image optical projection device 15 are of the type shown and described in the patents to Thomas Nos. 2,097,706; 2,145,437; 2,152,224; 2,251,177 and 2,281,607.

Figure 7:
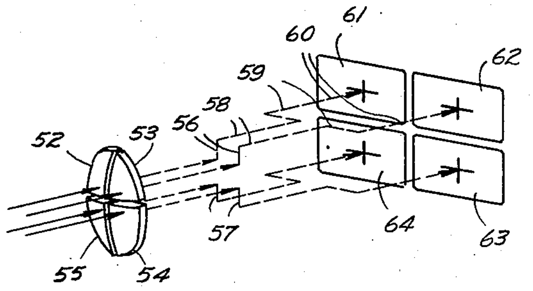
Fig. 7 is a diagrammatic isometric view showing the course of paraxial rays within the multiple image optical reproducing device in the production of a group of four separated, substantially identical images.

Fig. 7 illustrates one arrangement of the optical system contained within the multiple image optical reproducing device 33, which comprises a group of four lens segments, deflecting means and light filters. Each lens segment contains its optical center and axis, wherein four separated, substantially identical images of a single colored object are simultaneously reproduced. The course of the light rays passing through the optical system is represented by dotted lines. The paraxial rays through the upper lens segments 52 and 53 are deflected upwards at 56 while the lower paraxial rays through the lens segments 53 and 54 are deflected downwardly at 57. Thereafter the upper paraxial rays continue their course toward the image areas, on which each of the lens segments forms its image, as indicated at 58, and are parted and oppositely deflected at 59. The rays are then guided toward the geometric centers of the image areas 61 and 62, as indicated at 60. The paraxial rays passing through the lower lens segments 53 and 54 are similarly deflected, and guided toward the geometric centers of the image areas 63 and 64. The images reproduced on the image areas 61, 62, 63, and 64 have different color values, such as red, green, violet and blue in that order. This is accomplished by four light filters positioned within the optical system.

The deflecting means referred to in Fig. 7 may consist of prisms or members provided with parallel sides either alone or in combination with suitably positioned reflecting surfaces, or such reflecting means may be used alone or may be combined with refracting means.

Figure 8:
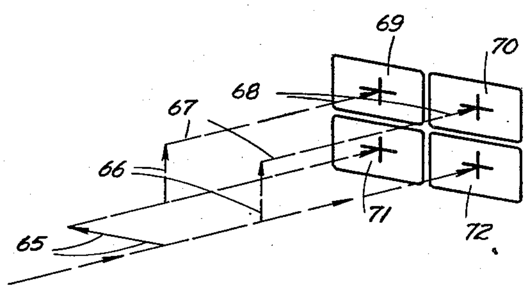
Fig. 8 is a diagrammatic isometric view showing another arrangement of the optical system within the multiple image optical reproducing device.

In Fig. 8 another arrangement is illustrated of the optical system contained within the multiple image optical reproducing device 33.

In this arrangement the light rays from the single objective field to be transmitted enters a single combination refracting partial reflecting means, instead of a group of four lens segments as shown in Fig. 7. The course of the light rays undergoing refraction and partial reflection is indicated at 65. Thereafter part of the light rays continue on their course directly rearwardly through additional combination refracting partial reflecting means 66 and lenses 68 to the geometric centers of the lower image areas 71 and 72. The portion of the light rays taking the upper course in the optical system are shown being refracted upwardly at 66 and again being refracted rearwardly at 67 toward their objective. The rays continue on their course through lenses 68 to the geometric centers of the upper image areas 69 and 70. By an arrangement of light filters identical with that described in Fig. 7 the images on the image areas 69, 70, 71, and 72 of Fig. 8 have identical color values, such as red, green, blue and violet.

The refracting means referred to in Fig. 8 may consist of prisms and optical elements or blocks of various shapes and sizes, including rhomboidal and/or trapezoidal blocks, either alone or in combination. The partial reflecting means referred to in Fig. 8 comprises the partially silvered surface of a block or prism wherein the partially silvered surface constitutes a partial reflection plane. The partial reflecting means may be used alone or in combination with refracting means.

The reproduction of the group of images *a*, *b*, *c* and *d* on the crystal 49 in Figs. 2, 5 and 6 can be likened to the formation of the images on the image areas 61, 62, 63, 64 in Fig. 7 or 69, 70, 71, 72 in Fig. 8.

The colors of the light filters may differ from that indicated above.

I have now disclosed in detail with reference to the drawings the types of apparatus and their proper combination, in order to produce the transmitting portion of my color television system.

Referring now to the drawing, and more particularly to Fig. 1 thereof, there is shown a particular type of cathode ray tube 1 that is used in combination with a multiple image optical projection device 15 to produce the receiving portion of my color television system. The receiver tube 1 is of the type disclosed by Rosenthal in Patents No. Re. 22,628 and No. Re. 22,734. The receiver tube 1 contains the conventional electron source 2 and control grid 3, a beam focussing coil 4, deflecting coils 5, 6 and an accelerating anode 7.

The picture or other signals representative of visual information produced by the camera tube structure 1 are intercepted by the receiver 8 of the receiver tube structure 1. The said signals are applied between the cathode and control grid in such a way that the positive potential of the grid decreases with increase in signal strength, so that a modulated beam is produced and is swept over the image screen in the conventional manner and is made to follow with utmost fidelity the sweep of the radiant beam of energy as it generates the picture or other signal in the camera tube structure 1 at the transmitter. The image screen consists for instance of a flat crystal 9 of an alkali halide such as potassium chloride, provided on each side with an electrode 10, 11 designed to permit the passage of light. These electrodes are shown in the form of thin transparent sputtered metallic layers, but they can also be in the form of fine meshes or the like. The potential of the electrode 11 is maintained positive with respect to that of the electrode 10 to provide an electric field in the crystal. Positioned exterior and adjacent to the rear wall of receiver tube structure 1 and directly behind the crystal 9 is an external light source 13 and condenser system 12 for illuminating and causing light to pass through said crystal 9 and thence through a multiple image optical projection device 15 to form a magnified image on a projection screen 16 of any visual information produced on said crystal 9.

Visual information on the crystal 9 can be produced by the tube 1 as follows:

The electrons produced by electron gun 2 are focused, modulated in intensity in accordance with the received picture signals to produce in elemental portions of said crystal 9 impinged by the beam an opaque deposit of a density corresponding to the instantaneous intensity of the beam. No such deposit will be produced if this intensity be practically zero. After the beam leaves the elemental area in which a deposit has been produced, the deposit persists and moves through the crystal in the direction of its thickness towards the more positive electrode 11 where it disappears. The velocity of this opaque deposit or opacity center is proportioned to the electric field strength in the crystal and increases also with an increase in temperature of the crystal.

The opacity of a given elemental area which corresponds to the intensity of the impinging beam, will thus remain essentially constant until the beam strikes the area at the next scan, when the opacity will immediately adjust itself to the new value of the impinging beam.

Alternately the datum level may correspond to black, in which case the condition is reversed, and the beam as it strikes an elemental area, is adapted to remove the deposit therefrom to an extent depending upon its instantaneous intensity. The area thus changed is caused to return to a maximum value corresponding to black.

The gross of any given intensity of the incident radiation may be an increase of the deposit for lower intensities and decrease for the higher intensities.

The fugitive image reproduced in the crystal screen 9 of receiver tube 1 is comprised of a multitude of opacity centers and co-existing for a limited time period in different elemental areas of the screen, and represents visual information by the combined effect of more or less transparent or opaque elemental screen areas and can be regarded as the equivalent of a photographic image.

The fugitive pseudo photographic image reproduced on the crystal screen 9 of receiver tube 1 as described above can normally be projected directly on to a projection screen by a suitable lens objective to form an enlarged picture in monochrome.

Figure 9:
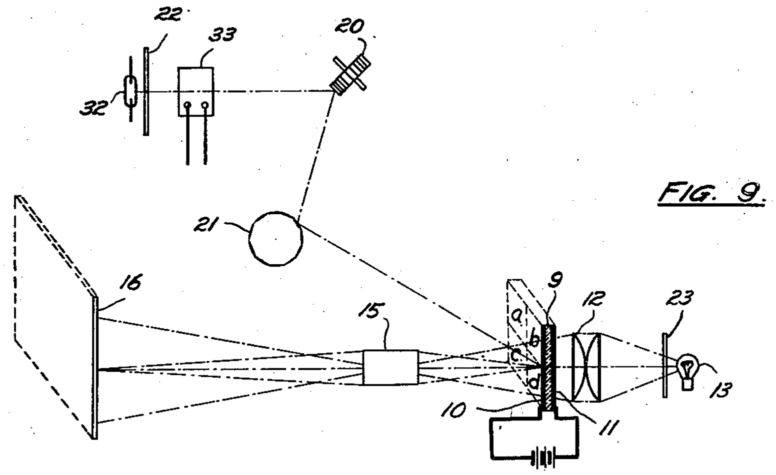
Fig. 9 shows schematically a light beam being used for scanning the image screen of the receiver tube with multiple image optical projection device in position.

By combining a multiple image optical projection device 15 with said receiver tube 1 as shown in Figs. 1 and 9 it is possible to restore the correct color to each image of the group of four monochrome images *a*, *b*, *c* and *d* reproduced on the crystal screen 9 of receiver tube 1 as described above from received picture signals representative of the brightness and color of the group of corresponding images *a*, *b*, *c* and *d* on the crystal 49 of camera tube 1 as shown in Figs. 2, 5 and 6.

The said group of images *a*, *b*, *c* and *d* reproduced on the crystal 9 of said receiver tube 1 are simultaneausly projected by said external light source 13 and condenser system 12 through said multiple image optical projection device 15, which is similar to the optical device 33 used on the camera tube 1, and onto a projection screen 16 as a single composite image or picture in perfect register in substantially natural colors.

Figure 10:
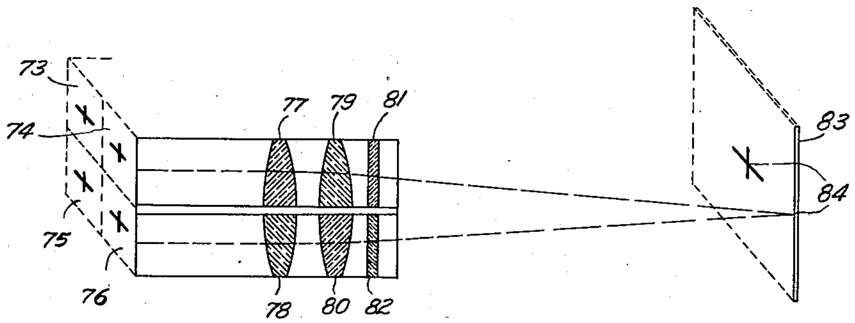
Fig. 10 shows schematically the course of the light rays within the multiple image optical projection device in producing a composite picture on a viewing screen.

Fig. 10 illustrates one arrangement of the optical system contained within the multiple image optical projection device 15, which comprises four similar quadrantal lens systems and light filters adjustably positioned therein, whereby a group of four separated, substantially identical images differing in color value may simultaneously be projected upon a viewing screen as a single composite image in exact superimposition and registration. The course of the light rays passing through the optical system is indicated by dotted lines. The images on the image areas 73, 74, 75 and 76 are representative of different color values. The method of reproducing these monochrome images by television is described in detail in connection with the drawings represented by Figs. 1 and 9. The image at 73 is representative of the color value of red, at 74 green, at 75 blue and at 76 violet. The group of four images is simultaneously projected through the quadrantal lens systems 77, 78, 79, and 80 and thence through a system of four light filters 81 and 82, identical in color to those used in Figs. 7 and 8, which restores the color to the images, and then on to a viewing screen 83 where a single composite image 84 is formed substantially in natural colors.

In modifications of this arrangement and method, two, three or more lens segments or systems may be employed.

The projection of the group of images *a*, *b*, *c* and *d* on the crystal 9 in Figs. 1 and 9 can be likened to the projection of the images on the image areas 73, 74, 75, 76 in Fig. 10.

The appearance of opacity centers in any given elemental area of the crystal 9 is accompanied by a corresponding change in the refractive index of this area, with respect to the refractive index of the remaining areas.

This change in the refractive index is utilized in forming a visible image on a projection screen. In Fig. 1 the so called Topler-Schlieren method is used for this purpose. This method consists of making visible in a transparent medium those regions in which the refractive index differs but slightly from that of the surrounding regions. In this method the condenser lens system 12 forms as image of the light source 13 on the opaque bar 14, so that in the absence of any changes in the refractive index of the crystal 9, no light proceeding from the crystal can pass the bar 14. Thus, when the medium between the lens 15 and screen 9 is homogeneous, the lens appears dark; but any local variation in the medium will cause some of the rays to be diverted and escape the opaque bar 14.

If now a change in the refractive index, and hence a change in the optical path through the material forming a given elemental area of the crystal is produced, the light rays passing through this area will experience a change of direction, so that some of the light will pass the bar 14. This light is utilized by the multiple image optical projection device 15 to form a single composite image in color on the projection screen 16 of the group of images *a*, *b*, *c* and *d* reproduced on the crystal 9 from received picture signals as previously described. In order to obtain a satisfactory picture on the projection screen 16 it is necessary that the quantity of light proceeding from a given elemental area of the crystal which passes the bar 14 should be substantially proportional to the intensity of the radiant energy producing the change in the optical path in the elemental area, since it is this quantity of light which determines the intensity of the corresponding elemental area of the picture on the screen 16. Now this quantity of light is not proportional to the optical path through the elemental area under consideration but is proportional to the first differential of this, i. e. if $y$ represents the geometrical path through the crystal (if the light is incident normally on the crystal $y$ will represent the thickness of the crystal), if $n$ represents the refractive index of the material of the elemental area, and if $x$ represents any linear dimension of the area in the plane of the crystal, then $yn$ gives the optical path and the quantity of light passing the bar 14 is proportional to $$\frac{d(yn)}{dx}$$

This latter expression will be hereinafter referred to as the gradient of the optical path.

Figure 13:
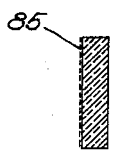
Fig. 13 shows an alternate form of construction of the image screen in the receiver tube.

This gradient along the screen surface in the optical path through each elemental area of the screen may be produced by modulating the intensity of the scanning beam with high frequency oscillations derived from the source 18, the frequency of these oscillations being in the neighbourhood of element frequency, so that there is produced a gradient in the refractive index of the crystal in the line scanning direction over each elemental area, and hence a gradient in the optical path. This gradient is then altered by the signal modulations superimposed on the high frequency modulations. This effect can also be produced by using an unmodulated beam (except for the signal modulations) and interposing a fine metallic grating (85, Fig. 13) at or near the scanned surface of the crystal, or such a grating may be in the form of a partly transparent metallic deposit on the crystal surface and acting at the same time as one of the crystal electrodes.

In Fig. 9 is shown the use of a light beam instead of a cathode ray beam for creating the opacity in the crystal. A beam of light from the source 32, shown as a luminous discharge tube is modulated in intensity in accordance with received picture signals by the light modulator 33, which can be of any suitable type, and is caused to scan the crystal by means of the two scanning members 20, 21. Light from the source 13, is shown as an incandescent lamp, is utilized to project the images *a*, *b*, *c* and *d* through the optical projection device 15 onto the projection screen 16. The differentiation of the light sources 32, 13 may be assisted by the use of suitable filters, indicated at 22 and 23.

The removal of the deposit by the application of heat can be accomplished in many cases by the heat produced by the incident cathode ray beam, or by the heat rays emitted by the external light source 13, or by both. Other methods are illustrated in Figs. 11 and 12.

Figure 11:
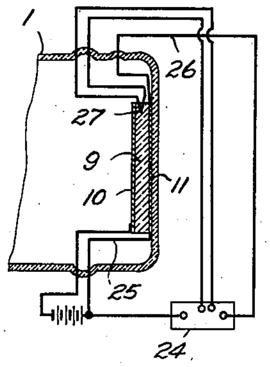

In Fig. 11 the crystal 9 is maintained at a constant predetermined temperature by means of an electric current from a source 24 which is controlled by means of the thermocouple 27 connected to the crystal. The current is passed through the electrode 11 by way of the conductors 25, 26. This heating arrangement can be connected to any of the electrodes shown in the previous figures.

Figure 12:
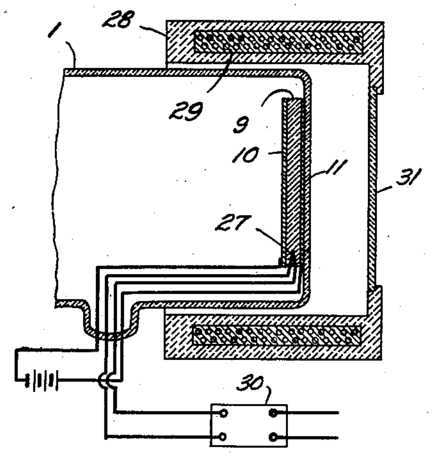
Figs. 11 and 12 show apparatus for heating the image screen.

In Fig. 12 the crystal 9 is maintained at a constant predetermined temperature by means of an oven 28 surrounding the crystal. An electric current from a source 30 supplies the heat energy for the coil 29, while a thermocouple 27 controls the temperature. The light rays from the external light source illuminate the crystal 9 by passing through a window 31 provided in the oven.

What I claim as new, and desire to secure by Letters Patent, is:

1. In a color television system which includes a signals generating apparatus with simultaneous component color image forming optical system and having an internal variable energy image screen consisting of an alkali halide material whose internal energy can be raised or lowered by the influence of different radiations and of the type in which image forming luminous radiations falling on each volume element of said image screen producing volume instead of surface effects in the form of rising electrical energy within said volume elements, said rising energy being proportional to the intensity of said luminous radiations, an integrant part of the system being inherently capable of producing additive-color record signals substantially free from secondary electron redistribution effects and the generation of spurious color record signals due to electrons on the surface between nearby elemental areas, the combination which comprises an internal variable energy image screen, optical system adapted to simultaneously project by luminous radiations on the volume elements of said screen a plurality of separated substantially identical optical images corresponding to different color components of an object to simultaneously produce within the volume elements of said screen corresponding electrical energy charge images representative of the different color components, means to generate a beam of electron radiations of proper intensity, means for scanning said image screen with said beam to produce corresponding trains of additive-color record signals, and means for transmitting said signals.

2. In a color television system which includes a signals generating apparatus with simultaneous component color image forming optical system and having an internal variable energy image screen consisting of an alkali halide material whose internal energy can be raised or lowered by the influence of different radiations and of the type in which image forming electron radiations falling on each volume element of said image screen producing volume instead of surface effects in the form of rising electrical energy within said volume elements, said rising energy being proportional to the intensity of said image forming electron radiations, an integrant part of the system being inherently capable of producing additive-color record signals substantially free from secondary electron redistribution effects and the generation of spurious color record signals due to electrons on the surface between nearby elemental areas, the combination which comprises, means including a translucent photo electric layer, an internal variable energy image screen, optical system adapted to simultaneously project by luminous radiations on said layer a plurality of separated substantially identical optical images corresponding to different color components of an object to simultaneously produce by image forming electron radiations within the volume elements of said image screen corresponding electrical energy charge images, means to generate a beam of electron radiations of proper intensity, means for scanning said image screen with said beam to produce corresponding trains of additive-color record signals, and means for transmitting said signals.

3. In a color television system which includes an electric signals reconstituting optical superposing projection apparatus adapted to translate additive-color video signals into black and white television images representing color components, an integrant part of the system being inherently capable of projecting with high optical efficiency to a common viewing screen large primary color television images in superposed relation in which the light energy is derived from a constant source of high luminous intensity and not from converted signal modulated power, the combination which comprises, a cathode beam controlled light valve having storage characteristics and adapted to produce in a plane a plurality of separated substantially identical optical transparency images corresponding to a plurality of separated identical sets of received additive-color record signals and to maintain in a plane said identical images during the greater portion of a field period, means providing a common viewing screen, means including a constant light source of high luminous intensity and a condenser system for projecting light upon said transparency images, means comprising a superposing multiple image optical projection lens system with primary color light filters contained therein, for converging and focusing the light projected through said transparency images upon a common viewing screen with considerable magnification whereby a single composite optical image with component colors restored may be produced on said common viewing screen.

THOMAS T. HARRINGTON.

REFERENCES CITED

The following references are of record in the file of this patent:

UNITED STATES PATENTS

| Number | Name | Date |
|---|---|---|
| 2,330,172 | Rosenthal | Sept. 21, 1943 |
| 2,389,646 | Sleeper | Nov. 27, 1945 |